US009449233B2

(12) United States Patent
Taylor

(10) Patent No.: US 9,449,233 B2
(45) Date of Patent: Sep. 20, 2016

(54) DISTRIBUTED TARGET TRACKING USING SELF LOCALIZING SMART CAMERA NETWORKS

(75) Inventor: Camillo Jose Taylor, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 648 days.

(21) Appl. No.: 13/309,543

(22) Filed: Dec. 1, 2011

(65) Prior Publication Data

US 2012/0249802 A1 Oct. 4, 2012

Related U.S. Application Data

(60) Provisional application No. 61/418,789, filed on Dec. 1, 2010, provisional application No. 61/418,799, filed on Dec. 1, 2010, provisional application No. 61/418,805, filed on Dec. 1, 2010.

(51) Int. Cl.
*H04N 5/225* (2006.01)
*G06K 9/00* (2006.01)
*G06T 7/00* (2006.01)
*G06T 7/20* (2006.01)
*H04N 7/18* (2006.01)

(52) U.S. Cl.
CPC ......... *G06K 9/00771* (2013.01); *G06T 7/0081* (2013.01); *G06T 7/2093* (2013.01); *G06T 2207/30241* (2013.01); *H04N 7/181* (2013.01)

(58) Field of Classification Search
None
See application file for complete search history.

(56) References Cited

U.S. PATENT DOCUMENTS

| 5,436,672 | A  | * | 7/1995  | Medioni | ............ H04N 5/2723 348/169 |
| 6,567,116 | B1 | * | 5/2003  | Aman et al. | .................. 348/169 |
| 7,421,113 | B2 |   | 9/2008  | Taylor | |
| 7,489,804 | B2 | * | 2/2009  | Kontsevich | .................. 382/103 |
| 7,522,765 | B2 |   | 4/2009  | Taylor | |
| 2001/0033246 | A1 | * | 10/2001 | Burchett et al. | ................ 342/91 |
| 2002/0171736 | A1 | * | 11/2002 | Gutta et al. | ................... 348/143 |
| 2002/0196976 | A1 |   | 12/2002 | Mihcak et al. | |
| 2005/0163343 | A1 | * | 7/2005  | Kakinami et al. | ............ 382/103 |
| 2005/0178876 | A1 | * | 8/2005  | Brunson | ................. F42B 15/01 244/3.18 |
| 2008/0159593 | A1 | * | 7/2008  | Taylor | ........................... 382/103 |
| 2010/0128138 | A1 | * | 5/2010  | Nitta et al. | ................. 348/222.1 |
| 2011/0081043 | A1 | * | 4/2011  | Sabol | ................... G06T 7/2053 382/103 |
| 2011/0235908 | A1 |   | 9/2011  | Ke et al. | |
| 2012/0250978 | A1 |   | 10/2012 | Taylor | |
| 2012/0250984 | A1 |   | 10/2012 | Taylor | |

OTHER PUBLICATIONS

Velipasalar et al. "Multiple Object Tracking and Occlusion Handling by Information Exchange Between Uncalibrated Cameras", Conference: Image Processing, IEEE International Conference—ICIP , pp. 418-421, 2005.*
Camillo et al, "Fast Segmentation via Randomized Hashing", Proceedings of the British Machine Conference, BMVA Press, Sep. 2009, 60.1-60.11.

(Continued)

*Primary Examiner* — Frederick Bailey
(74) *Attorney, Agent, or Firm* — Baker & Hostetler LLP

(57) ABSTRACT

A plurality of camera devices are configured to localize one another based on visibility of each neighboring camera in an image plane. Each camera device captures images and identifies sightings of candidate targets. The camera device share information about sightings and triangulate positions of targets. Targets are matched to known tracks based on prior images, allowing targets to be tracked in a 3D environment.

14 Claims, 14 Drawing Sheets

(56) References Cited

OTHER PUBLICATIONS

Focken, D., and Stiefelhagen, R., "Towards Vision-Based 3-d People Tracking ina Smart Room" in Proceedings of the Fourth IEEE International Conference on Multimodal Interfaces (ICMI 02), 2002, 400-405.

Kayumbi, "Global Trajectory Reconstruction From Distributed Visual Sensors" in International conference on distributed Smart Cameras, 2008, 1-8.

Klausner et al, "Distributed Multilevel Data Fusion for Networked Embedded Systems", in Selected Topics in Signal Processing, IEEE Journal of Publication Date: Aug. 2008, 2(4), 538-555.

Medeiros et al, "Distributed Object Tracking Using a Cluster-Based Kalman Filter in Wireless Camera Networks", IEEE Journal of Selected Topics in Signal Processing, Aug. 2008, 2(4), 448-463.

Quinn et al, "VISNET: A Distributed Vision Testbed" in ACM/IEEE International Conference on Distributed Smart Cameras, Sep. 2008, 364-371.

\* cited by examiner

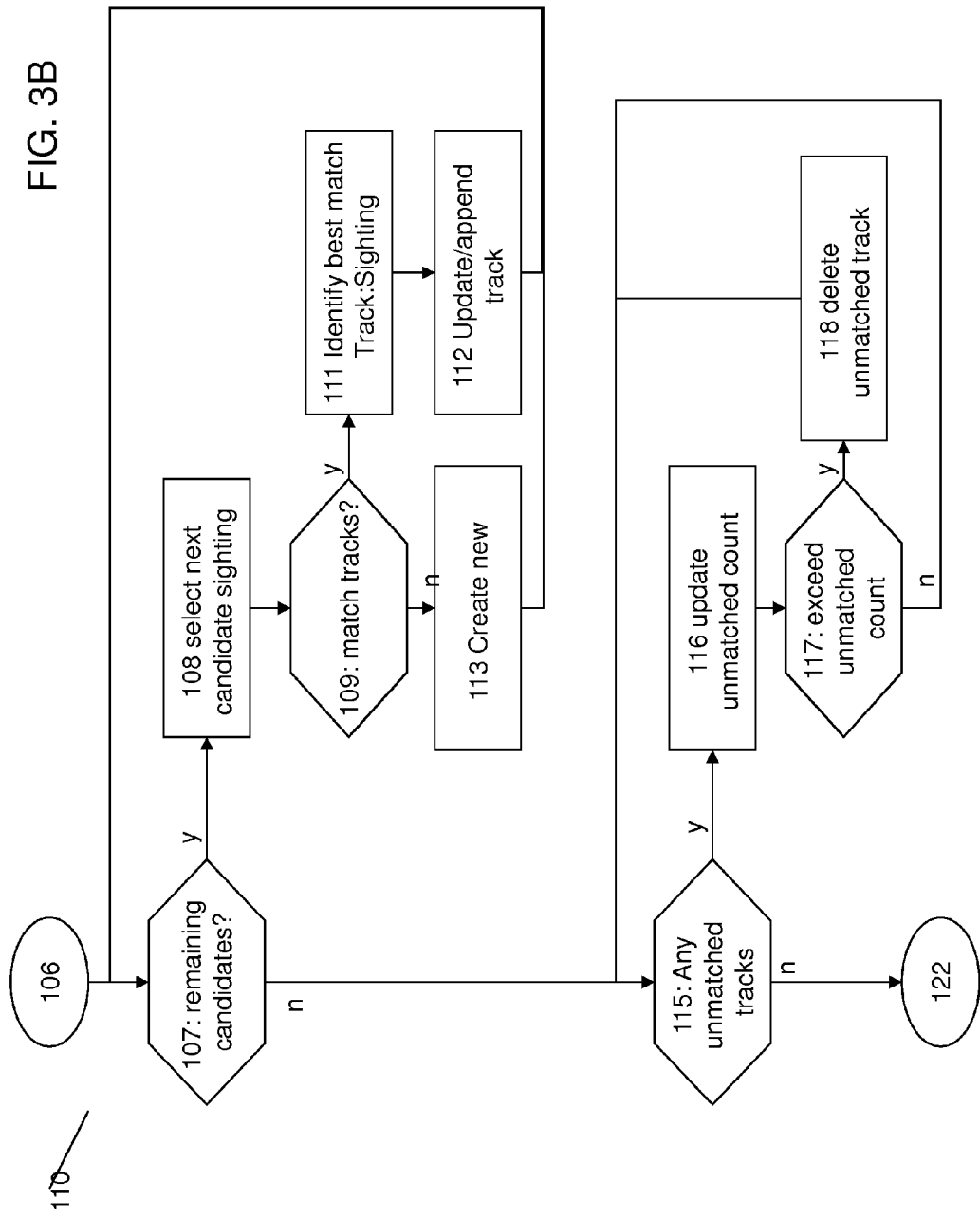

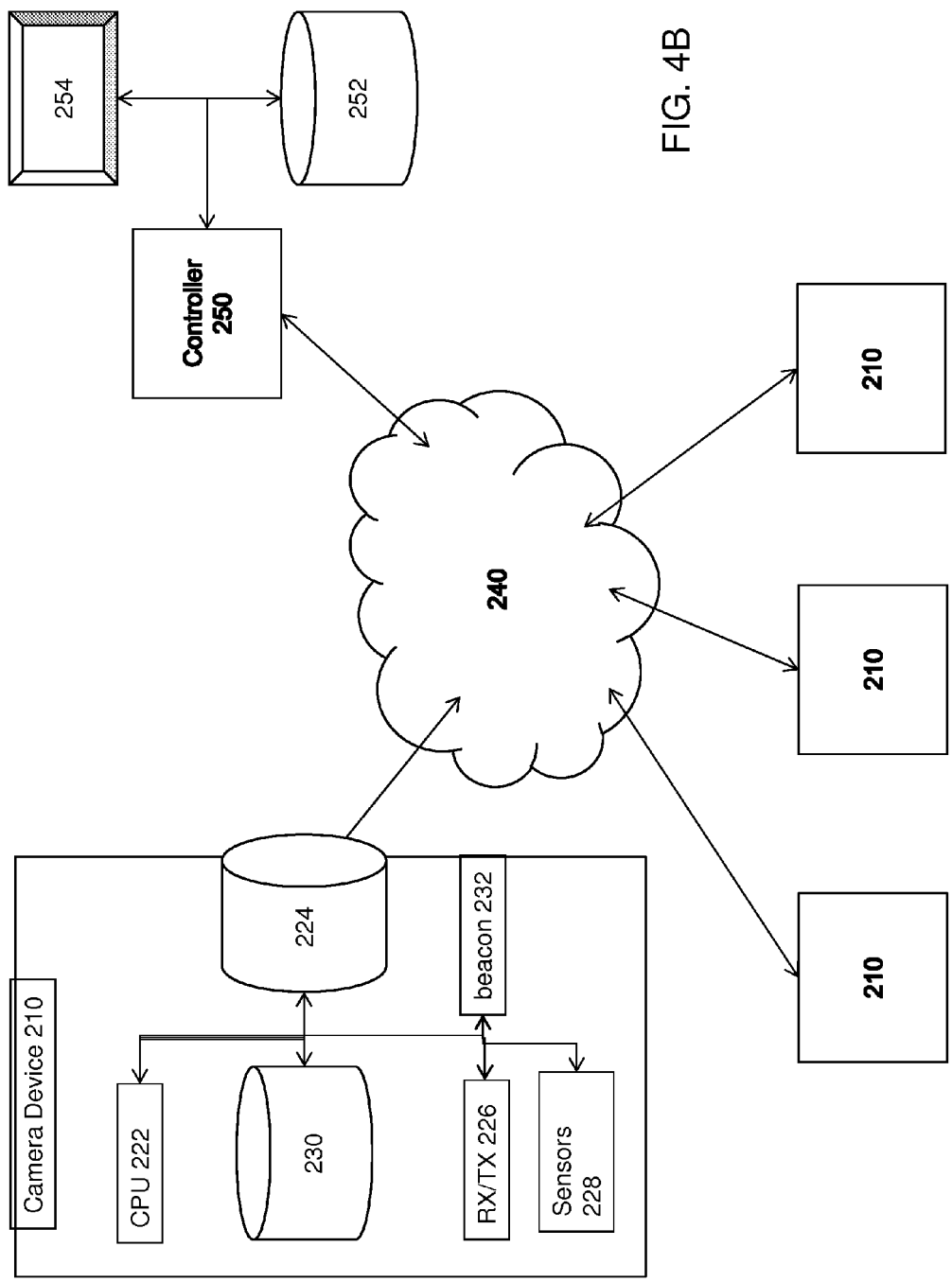

DISTRIBUTED TARGET TRACKING USING SELF LOCALIZING SMART CAMERA NETWORKS

CROSS REFERENCE TO RELATED APPLICATIONS

The present application claims priority to provisional patent applications 61/418,789, 61/418,805, and 61/418,799 which are incorporated by reference in their entirety.

The present application relates to concurrently filed patent applications entitled "Scene Analysis Using Image and Range Data" and "Image Segmentation for Distributed Target Tracking and Scene Analysis" both of which are incorporated by reference in their entirety and filed on the same day as the present application entitled "Distributed Target Tracking Using Self Localizing Smart Camera."

TECHNOLOGY FIELD

The present invention relates generally to machine vision systems and methods and specifically to object tracking and scene analysis for distributed or mobile applications.

BACKGROUND

The decreasing cost and increasing performance of embedded smart camera systems makes it attractive to consider applying them to a variety of surveillance and tracking applications. In the near future it may be possible to deploy small, unobtrusive smart cameras in the same way that one deploys light bulbs, providing ubiquitous coverage of extended areas. It would be therefore desirable to have a system and method for using such a system to track passengers at an airport from the time that they arrive at curbside check in to the time that they board their flight. Similarly, it would be desirable to have a system and method to monitor the movements elderly or infirm individuals in their homes in order to improve their quality of care.

There is a need to reliably detect, localize and track targets as they move over an extended area of regard covered by multiple distributed smart cameras. However, there is presently a lack of systems and method that allow detection and tracking which can be distributed over multiple sensors without requiring excessive amounts of communication. These systems would ideally be scalable to allow for deployments that may involve thousands of cameras distributed over extended regions and be robust to failure so that the overall system responds gracefully when individual sensors are added or removed asynchronously.

Most detection and tracking systems that have been developed or proposed fuse information from multiple sensors at a central point in the network which is responsible for establishing tracks and associating measurements from different views. As the number of sensors grows, increasing demands are placed on the communication system which must route information to these processing centers. Moreover, failures in these processing centers can often render the entire network useless.

There have been some approaches to tracking using camera networks. For example Kayumbi, Anjum and Cavallaro describe a scheme for localizing soccer players with a network of distributed cameras. (G. Kayumbi, N. Anjum, and A. Cavallaro, "Global trajectory reconstruction from distributed visual sensors," in *International Conference on Distributed Smart Cameras* 08, 2008, pp. 1-8.)

Quinn et. al. propose a scheme for calibrating a set of cameras in a room and using them to track targets. (M. Quinn, R. Mudumbai, T. Kuo, Z. Ni, C. De Leo, and B. S. Manjunath, "Visnet: A distributed vision testbed," in *ACM/IEEE International Conference on Distributed Smart Cameras*, 2008, September 2008, pp. 364-371.) Their approach splits the tracking task between a collection of smart camera nodes and a higher level process which fuses the sightings from these cameras. However, there is still a need to develop protocols that can be employed on large networks covering extended areas.

Medeiros, Park and Kak [9] describes a distributed approach to triangulating targets and distributing the tracking task over multiple nodes. (H. Medeiros, J. Park, and A. C. Kak, "Distributed object tracking using a cluster-based kalman filter in wireless camera networks," *IEEE Journal of Selected Topics in Signal Processing*, vol. 2, no. 4, pp. 448^63, August 2008.) This protocol involves electing a leader associated with every tracked object which is responsible for maintaining that track. Klausnet Tengg and Rinner describe a distributed multilevel approach to fusing the measurements gleaned from a network of smart cameras. (Klausner A. Tengg A. Rinner B., "Distributed multilevel data fusion for networked embedded systems," in *Selected Topics in Signal Processing, IEEE Journal of Publication Date: August* 2008, August 2008.) There remains a need, as networks grow to allow the protocol to be scalable, such as allowing the cameras to be viewed as peers.

SUMMARY OF THE INVENTION

Embodiments of the present invention address and overcome one or more of the above shortcomings and drawbacks, by providing devices, systems, and methods for tracking objects moving in an multi-camera environment. This technology is particularly well-suited for, but by no means limited to, a surveillance system utilizing multiple cameras with intersecting fields of view.

Embodiments of the present invention are directed to a method for tracking one or more targets including determining, by a first camera device, the location of a second camera device further determining by a first camera device, the location of a second camera device. The method captures a first image by the first camera device and a second image by the second camera device. The method extracts a first set of one or more target sightings in the first image and a second set of one or more target sightings in the second image using an image segmentation technique. The method further exchanges information about the first and second sets of one or more target sightings. The method triangulates target sightings from the first and second set of one or more target sightings to create a third set of target sightings. The method further matches at least a subset of the third set of target sightings to known tracks maintained by the first camera.

According to one embodiment of the invention, the step of exchanging information occurs over a peer-to-peer wireless network. According to one aspect of the invention, the step of determining the location of a second camera is performed by observing the location of a blinking light associated with the second camera in an image plane of the first camera.

According to another aspect of the invention, the method further stores at least one updated track in a database of the first imaging device based on the matching step. According to yet another aspect of the invention, the method further communicates, by the first camera, at least on updated track that was matched by the matching step. According to yet another aspect of the invention, the method includes receiving, by a central controller, track information relating to at least a subset of the first and second first and second set of one or more target sightings to create a third set of target sightings; and storing, by the central controller, the track information.

According to yet another aspect of the invention, track information is displayed to a user. According to yet another aspect of the invention, the method deletes a first subset of one or more known tracks maintained by the first camera if the first subset of known tracks fails to match any of third set of target sightings after a predetermined amount of time. According to yet another aspect of the invention, the step of matching includes choosing the oldest known track when more than one known track matches at least one target sighting. According to yet another aspect of the invention, the method transmits information about known tracks, by the first camera devices, to at least a subset of neighboring camera devices.

In another embodiment of the invention, the present invention is directed to a camera device for tracking objects comprising an imaging device capable of capturing a first image. A processor is configured to determine, the location of a second camera device further determining by a first camera device, the location of a second camera device. The processor is configured to extract a first set of one or more target sightings in the first image using an image segmentation technique. The processor is capable of transmitting to a second camera device at least a port of the first set of one or more target sightings. The processor is configured to receive from the second camera device a second set of one or more target sightings in a second image captured by the second camera device. The processor is configured to triangulate target sightings from the first and second set of one or more target sightings to create a third set of target sightings. The processor is configured to match at least a subset of the third set of target sightings to known tracks maintained by the first camera.

According to one aspect of the invention, a transceiver is configured to exchange information with the second camera over a peer-to-peer wireless network. According to another aspect of the invention, a light source is configured to communicate an identity of the camera device to the second camera device. According to yet another aspect of the invention, memory is configured to store at least one updated track in a database of the first imaging device based on the matching step.

According to another aspect of the invention, the processor is further configured to communicate at least on updated track that was matched by the matching step to the second camera device. According to yet another aspect of the invention, the processor is further configured to send information relating to at least a subset of the first and second first and second set of one or more target sightings to create a third set of target sightings to a central controller. According to still another aspect of the invention, the processor is further configured to delete a first subset of one or more known tracks maintained by the first camera if the first subset of known tracks fails to match any of third set of target sightings after a predetermined amount of time. According to yet another aspect of the invention, the processor is further configured to choose the oldest known track when more than one known track matches at least one target sighting. According to yet another aspect of the invention, the processor is further configured to transmit information about known tracks to at least a subset of neighboring camera devices.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3B is a flow chart showing operation of an exemplary algorithm for use with tracking targets in the camera network;

FIG. 4B is a block diagram of an exemplary camera and network for use with embodiments of the present application;

DETAILED DESCRIPTION OF ILLUSTRATIVE EMBODIMENTS

Figure 1A:
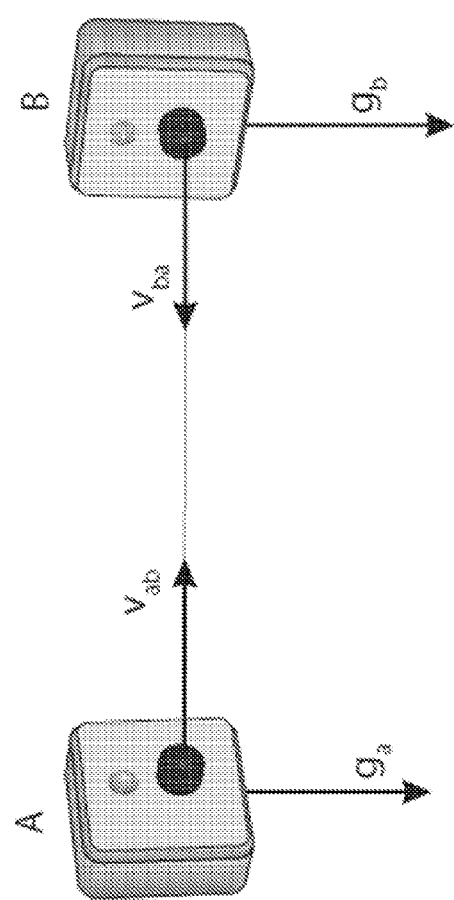
FIG. 1A is a simplified diagram of an exemplary camera network for use with the present application.

The present application describes an approach to detection and tracking for smart camera networks which is generally decentralized. This allows the smart cameras to automatically detect and localize other camera nodes with overlapping fields of regard and to establish communication graphs which reflect how the nodes will interact to fuse measurements in the network. Embodiments can utilize network protocols with limited communication requirements, which allow the system to distribute detection and tracking problems evenly through the network accounting for sensor handoffs in a seamless manner.

In this approach each of the cameras, or a subset of the cameras, independently analyzes its video imagery to find moving targets in its field of view the results of this analysis are fused in the network to triangulate the location of the objects of interest in space. This approach devolves the low level image processing to the smart cameras and allows the nodes to use the limited wireless bandwidth more efficiently since they need only share sighting measurements and track data with their near neighbors. Using this approach we have been able to demonstrate real time tracking of targets over an extended area using a collection of embedded smart cameras, deployed in an ad-hoc manner and connected by a wireless communication network.

The approach can also distribute knowledge about the state of tracked objects throughout the network. This information can then be harvested through distributed queries which allow network participants to subscribe to different kinds of events that they may be interested in. For example, a process operating on a processor associated with a camera or a network of cameras could request to be updated on all movements of a particular target. Similarly, a process may want to be told about all targets that pass through a particular area of interest. These approaches can be used to develop simple but robust tracking systems that respect the constraints of a distributed deployment context.

The approach leverages the fact that the nodes can recover the relative position and orientation of their neighbors automatically. This makes it feasible to consider deploying large collections of smart camera nodes in an ad-hoc manner since one need not manually survey their relative locations. Furthermore, it allows the smart cameras to rapidly and reliably determine the nodes with which it must collaborate in the tracking application. This can reduce the cost and complexity of fielding multi camera surveillance systems and allows them to be applied to a wider range of applications A suitable camera network for use with these methods and systems include a self-localizing camera network, such as that described in commonly assigned U.S. Pat. Nos. 7,421,113 and 7,522,765 titled "A SYSTEM AND METHOD FOR LOCALIZING IMAGING DEVICES," which are incorporated herein by reference.

In this localization scheme each of the embedded camera systems can be equipped with a controllable light source, typically an IR or visible LED, and a wireless communication system. Each smart camera uses its light source as a blinker to transmit a temporally coded binary sequence which serves as a unique identifier. The cameras detect other nodes in their field of view by analyzing image sequences to detect blinking pixels and, hence, are able to determine the relative bearing to other visible nodes. By knowing the location of the light source of other visible cameras, each viewing camera can determine the location of other cameras in the image plane. In some embodiments, the viewing camera can take into account the geometry and orientation of camera being observed (which may be obtained by peer-to-peer wireless communication between cameras) and determine an offset in the image plane to determine the location of the lens or optical sensor of the observed camera. This can increase accuracy, in some embodiments. In other embodiments, the location of the light source is a sufficient approximation of the location of the observed camera. In some embodiments the location of the blinking LED or the extrapolated location of the lens of the observed is used to determine an epipolar pixel associated with the observed camera's location.

This determination can be made by a CPU associated with the camera, which may include an embedded processor, mobile device, cloud computing environment, client-server environment, DSP, or dedicated hardware circuit capable of performing the methods disclosed herein.

FIG. 1A shows the simplest situation in which two nodes can see each other. In this embodiment, two smart cameras equipped with accelerometers and/or compass sensors can see each other and can determine their relative position and orientation up to a scale from the available measurements. For example, using the location of each blinking light source and the observed size and shape of the observed camera B, the observing camera A can determine the distance $V_{ab}$ to the observed camera B. Similarly, smart camera B can determine the distance $V_{ba}$ to the observed smart camera A. In some embodiments, smart cameras A and B communicate wirelessly to reach a consensus on the distance between the cameras, such as an average of $V_{ab}$ and $V_{ba}$. These measurements allow two smart cameras to determine their relative position and orientation up to a scale factor. In some embodiments, the distance can be predetermined using other methods, such as manual setting of a parameter or by IR range finding.

The resulting model of orientation and location of nearby cameras can be used to create a 3D model of the location of smart cameras. Accordingly, a stereoscopic image can be extrapolated based on a derived fundamental matrix or epipolar geometry using techniques known to a person of ordinary skill in the art. Similarly, the techniques used for corresponding epipolar pixels of nearby cameras described in U.S. Pat. Nos. 7,421,113 and 7,522,765 can be used.

In some embodiments the accelerometer measurements (such as the direction of gravity $g_a$ or $g_b$, and/or solid-state compass measurements (such as the direction of magnetic north) provide another independent source of information, about the orientation of the cameras with respect to the vertical axis.

Larger networks can be localized by leveraging this relative localization capability. When a collection of smart cameras is deployed in an environment, these visibility relationships induce a sparse graph among the cameras. These measurements can be used to localize the entire network up to scale. The scheme provides a fast, reliable method for automatically localizing large ensembles of smart camera systems that are deployed in an ad-hoc manner.

In addition to these visibility relationships, the smart camera nodes can also be related by a sparse web of wireless communication links. These links also depend upon the layout of the sensors since signal strength falls of with increasing distance. Taken together, these visibility and communication links induce a natural notion of locality where each camera can discover, localize and communicate with other camera systems in its immediate vicinity. This localization capability provides a basis on which each camera can correlate its own image measurements with those obtained from other neighboring vantage points and, hence, localize targets moving through its area of regard.

Figure 1B:
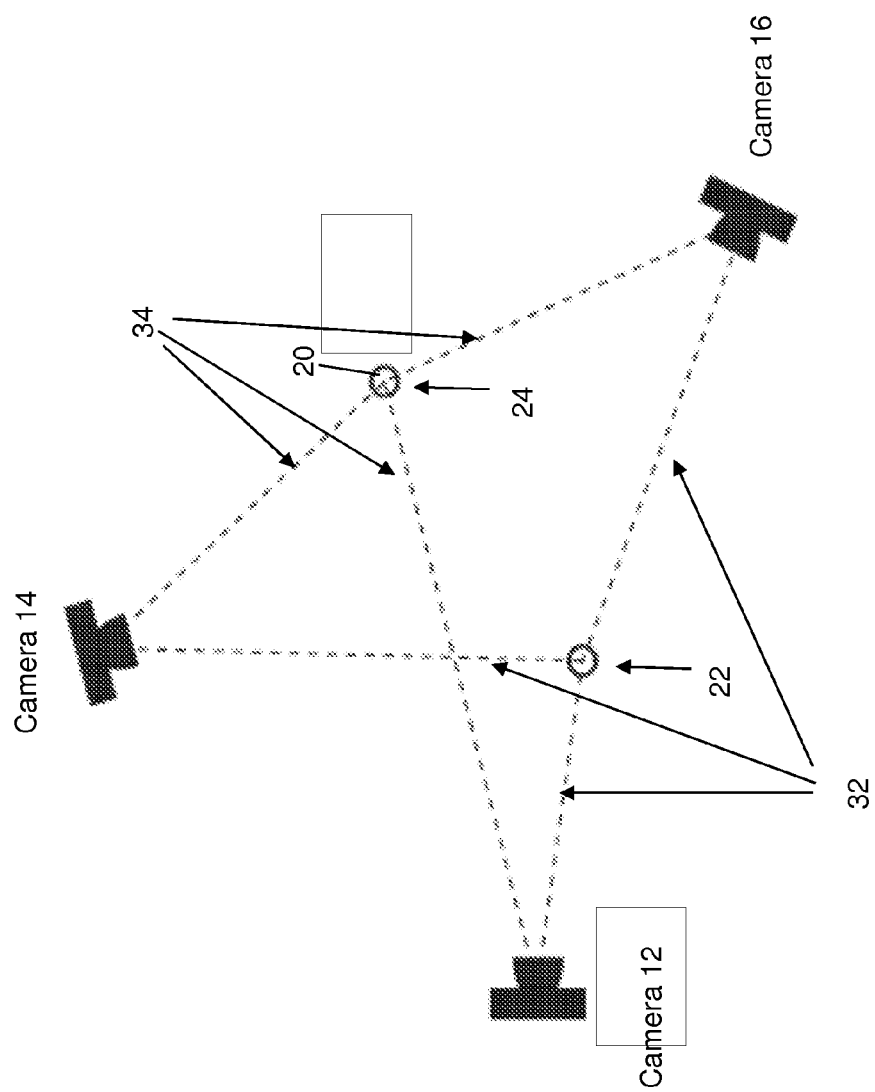
FIG. 1B is a top view an exemplary camera network for use with the present application detecting targets.

The measurements obtained from camera systems can be useful when they are combined together as depicted in FIG. 1B. FIG. 1B illustrates an exemplary situation where a target moving through the scene is localized in space by combining bearing measurements obtained from a variety of vantage points. Each observation of a candidate target (i.e. something that could be a target in the image) in an image is referred to as a sighting. Sightings can also be referred to as a target sightings, as each sighting can be considered an as-yet-unverified observation of a target. Each sighting indicates the presence of a candidate target in the image plane. Each bearing measurement (e.g. the vector from a camera to a sighting) allows the camera to determine the range to the associated target by looking for confirming evidence from at least two other cameras. The bearing measurements obtained from two or more smart camera systems can be fused via triangulation to determine the position of the targets in three dimensions. When three or more smart camera systems are viewing the same area of space redundant measurements are available which can be used to help eliminate false tracks. Collaborative tracking can be done when the bearing measurements can be relayed to a central location for processing.

In FIG. 1B, smart cameras 12, 14, and 16 observe object 20 as it moves through the image planes of each camera. Smart cameras 12, 14, and 16 make a first sighting at position 22, and a second sighting at position 24. At position 22, bearings measurements 32 can used to determine position 22 in a 3D coordinate system; at position 24, bearings measurements 34 can used to determine position 24 in the 3D coordinate system.

Using a distributed approach each, or at least one, camera localizes targets on its own by communicating with its neighbors. This is accomplished by having a node communicate its sightings to other nodes in its immediate neighborhood. Once this has been done, each camera independently considers every pair of sighting measurements that it learns about, for each of the resulting candidate points a camera looks for confirming sighting measurements in other views. The end result of this procedure is a set of candidate points in space which can be called targets.

In addition to the set of targets derived from the sighting measurements, each camera also maintains a set of active tracks corresponding to trajectories of targets over time. These track structures can be extrapolated and stored in an onboard memory associated with each smart camera. In some embodiments, a subset of the tracks can be transmitted to a central device, wirelessly, for archiving and further analysis, such as correlation with image/object semantic information or other related trajectories. Each of these track structures can contain a number of fields which are described in Table I.

TABLE I

Fields associated with each track data structure

| | |
|---|---|
| $(x, y, v_x, v_y)$ | State vector encoding the position and velocity of |
| C | Covariance matrix associated with the state estimate |
| track id | Globally unique identifier associated with the track. The smart camera that creates this track forms this number by concatenating its own unique |
| first timestamp | Time when the track was first created |
| last timestamp | Time when the track was last updated with a sighting |

Associated with each track is a state vector which encodes the position and velocity of the associated target along with the covariance matrices that are required to implement a Kalman filter tracker. Each track is tagged with a globally unique identifier which persists as the object moves through the entire scene. The track structure also contains timestamps indicating the first time that the tracked object was detected and the last time that the track was updated. In some embodiments, each camera samples and stores state vector and covariance matrix periodically, creating a record of the time variance of the track of each object. In some embodiments, the position and velocity vector is a two dimensional vector (x, y), while other embodiments may utilize a three dimensional vector (x, y, z). The velocity vector can be extracted from changes in the position vector.

On each cycle every smart camera participating can solve a data association problem, resolving the relationship between the current tracks and the current targets. One can model the situation in terms of a bipartite graph as shown in FIG. 3. Here the nodes on the left 40 depict the current tracks while the nodes on the 42 right depict the current targets. For a new image, each participating smart camera node can associate the detected targets with the tracks that it currently maintains. For each of the current tracks the system finds the best matching target - if any. In some embodiments, the system then selects between multiple associations by favoring tracks with longer histories. However, in some embodiments, other heuristics can be used, such as a confidence match using dead reckoning from past trajectory information or by extrapolating an expected position based on an interpolation or extrapolation of past and/or future points associated with a track. In FIG. 2A, the ultimate matches are indicated by solid lines while the dashed lines indicate possible matches that are rejected. This scheme causes the overall system to maintain the identities of the tracked objects as they move through the system. Detected targets that are not explained by any of the existing tracks can be used to create new tracks. When a smart camera creates such a track it concatenates its own unique smart camera identifier with a local counter value to form a globally unique identifier. This global identifier is then used in all subsequent communications and effectively travels with the object as it moves through the network.

For each track the cameras can determine the most probable target based on the Kalman filter estimate and covariance and link the nodes as shown. Note that at this stage there may be more than one track associated with each target. Each target can be assigned its best match among the list of possible tracks by considering the relative age of the tracks and choosing the oldest one. The measurements associated with this target are then used to update the Kalman filter associated with the winning track. Tracks that are not updated are propagated forward allowing for short periods of occlusion or tracker failure. Tracks that are starved of updates are eventually elided from the list. In this manner, short ephemeral tracks are removed from the system in favor of longer lasting records. In this scheme we assume that the clocks on the smart camera nodes are roughly synchronized so that timestamps can be compared without issue. This scheme can be similar to the best-hypothesis tracking scheme described in Dirk Focken and R. Stiefelhagen, "Towards vision-based 3-d people tracking in a smart room," in *Proceedings of the Fourth IEEE International Conference on Multimodal Interfaces (ICMI 02)*, 2002.

Once a camera has resolved the relationship between tracks and targets and updated the list of tracks, it can send its current list of active tracks to its neighbors receiving, in turn, a list of all the targets that they are tracking. In this manner, information about tracks and target identities is propagated through the network allowing for seamless hand-off as targets move throughout an extended scene. Note that ephemeral tracks may be introduced from time to time due to tracker failures or glitches but these can be corrected eventually since the system can be biased to prefer older labels for tracks wherever possible. This can cause occasional miss-associations in the triangulation phase. These cases typically produce outlier targets which do not win data association competitions and are thus starved for updates. Tracks which do not receive a sufficient number of updates per second can be eliminated and/or removed from memory. In some embodiment, a track must receive at least 2 updates per second.

This protocol allows the network of distributed, loosely coupled smart camera systems to achieve consensus on target identities. By preserving target identifiers, the entire system is able to track targets over extended areas without requiring a central coordinating authority.

In some embodiments, track and/or target updates can be communicated wirelessly on an ad hoc basis to nearby cameras, such as those that appear in a smart camera's image plane. Because this embodiment of the protocol only requires communication among near neighbors it can be scaled to networks of arbitrary size. In some embodiments, the local distribution of target and/or track information can include those smart cameras that can see the sending smart camera, as well as those that can be seen by the sending camera. That is, the distribution can include both those cameras that can be seen, as well as those that have sent updates to the camera current update. Furthermore, in some embodiments, some or all updates can be sent to a central controller for archival or further analysis.

The entire procedure carried out by the smart camera is outlined in Algorithm 1 in pseudo-code. This algorithm is further elaborated in FIGS. 3A and 3B.

Algorithm 1 Distributed Tracking Protocol
1: loop
2: Process current image and extract sightings
3: Gather sighting measurements from neighboring cameras
4: Triangulate sightings to obtain positions of current targets
5: Match current targets against the list of current tracks and update the tracks that are matched.
6: Targets which are not matched with any existing tracks are used to form new tracks.
7: Prune tracks that have not been updated recently.
8: Gather current tracks from neighboring cameras removing duplicates as needed
9: end loop For each iteration of this illustrative tracking algorithm, each participating camera can send to its neighbors a list of its current bearing measurements (step iii of the algorithm). It also sends out a list of its current tracks (step viii). Neighbors can include those cameras that a camera can see, those that can see it, a predetermined group of nearby cameras, or any combination thereof.

Figure 3A:
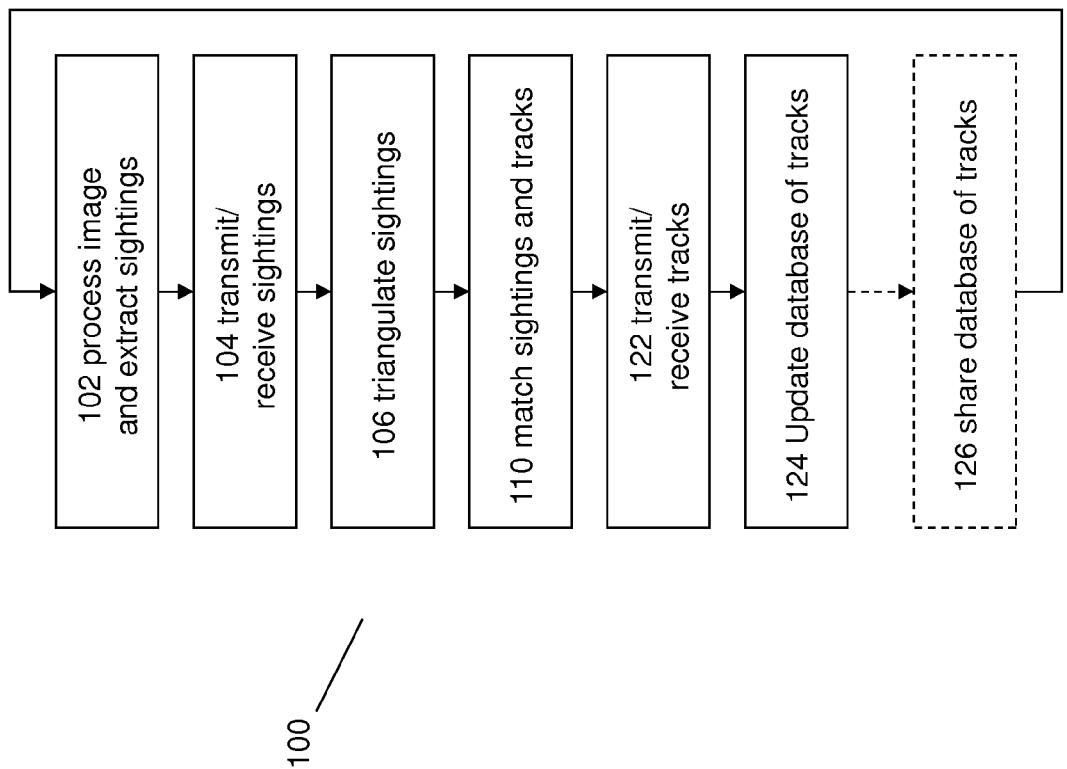
FIG. 3A is a flow chart showing operation of an exemplary algorithm for use with tracking targets in the camera network.

As shown in FIG. 3A, the tracking algorithm includes a main loop 100, which is performed by a processor in each of the smart cameras as they work together to track an object. By each performing algorithm 100 after cameras have localized neighboring cameras, neighboring cameras can operate on a peer-to-peer basis to track objects efficiently and accurately without necessarily having large processing capabilities. Loop 100 is performed after cameras are localized. At step 102, a camera processes an image frame and extracts sightings. This can be by any method described herein. In some embodiments, image processing can include a preprocessing step, which can include filtering, such as smoothing, color extraction, enhancing sharpness, brightness, or contrast, compression, or the like. Image processing can include segmentation of the image to determine salient features in the image, any known manner, including that explain below. In segmentation allows the camera to identify objects in an image. For example, one noon image segmentation scheme applies temporal analysis to the image to identify objects in the image that moved relative to background. Another available segmentation scheme includes pattern recognition, such as facial recognition. Another segmentation scheme may include increasing the contrast of an image to reduce the available shades or colors in an image for helping select those portions that have the same shading or color. In some embodiments, 3-D cameras are employed that can separate objects in the foreground from those in the background by observing the image depth. In some embodiments, image depth analysis is provided by a single two-dimensional camera with an IR rangefinder. In some embodiments, image segmentation is a hashing segmentation scheme, such as that disclosed in concurrently filed application, titled "Image Segmentation for Distributed Target Tracking and Scene Analysis,".

By utilizing image segmentation or other image analysis, smart camera is able to identify portions of the image that are candidate objects for tracking (i.e. sightings). These sightings are then identified and temporarily stored, such as in array.

At step 104 sightings identified in step 102, sightings are transmitted to neighboring cameras. Neighboring cameras also transmit sightings, so that each camera can receive an additional list of sightings by neighboring cameras.

At step 106, the locally identified sightings are compared to the sightings received from neighboring cameras. Because the epipolar geometry is known prior to object tracking, as explained above, the pixel coordinates of the sighting in to neighboring image claims can be used to triangulate a three-dimensional location of the sighting using the epipolar geometry of the two (or more) neighboring cameras. It should therefore be understood that prior to step 102, the epipolar geometry of each pair of neighboring cameras is determined as explained herein. In some embodiments, this triangulation step is used to identify corresponding sightings in the two image planes. That is, only certain pairs of sightings between adjacent cameras could possibly be the same sighting. In some embodiments, the features of the sighting are used to determine which pairs of sightings to correlate and triangulate. For example, sightings can be required to have similar color or shape. If multiple neighboring smart cameras share information about the same sighting, any additional sightings (e.g. beyond two) can be used to add precision to triangulated position of the sighting or to verify accuracy. At step 106, the result is a correlated group of one or more sightings that are correlated between the set of sightings observed and those received from adjacent camera devices.

At step 110 each camera matches the current sightings and their triangulated positions to its local database of past tracks. This concept is shown in FIG. 3B. FIG. 3B shows an exemplary embodiment of step 110. Step 110 is used to identify new tracks and identify those existing tracks from prior frames that correlate to at least a subset of the current sightings and update those tracks. At step 122, the current tracks or updates to current tracks can be transmitted to neighboring cameras. Similarly, tracks or updates to tracks can be received from neighboring cameras.

At step 124, the local database of tracks is updated to reflect the changes to tracks determined at step 110 and the received tracks from step 122.

In some embodiments, the database of tracks, or a subset of the database of tracks is transmitted beyond the nearest neighbors, such as to a central controller for archival, analysis, or display. By limiting step 126, the transmittal to a single central hub or transmitting a subset of tracks, or only occasionally transmitting tracks, step 126 can be designed to reduce burden on available wireless bandwidth.

FIG. 3B shows an exemplary embodiment of step 110. After triangulating sightings at step 106, at step 107 the list of available candidates sightings is observed to determine if there are remaining unmatched candidates. If there are available candidates, at step 108 the next candidate saving is selected for matching to tracks. At step 109 the position of the candidates adding is compared to known tracks in the local database to determine if the location matches the known trajectory of a recent track.

If the position matches a known track, at step 111 the best match of a track and sighting pair will be selected. In some embodiments, this is necessary, because multiple tracks may match threshold criteria for the same candidate saving. The heuristic for determining the best match can be the any method described herein. In some embodiments, the best match is determined to be the track the earliest first sighting. At step 112, the match is used to update the matched track. In some embodiments, updating of the match track may overwrite the trajectory of the track. In other embodiments, updating the track may append the new position velocity to the trajectory of the existing track. Then, the loop repeats at step 107.

If there is no match between the current candidates and an existing track, a new track may be created. That track's features can be populated based on the current sighting, including its location and the current time of the sighting. Then, the loop repeats at step 107.

Step 107 repeats until no remaining candidates are found in the image. At step 115 the camera can determine whether there are any tracks in its track database that have not matched to a current sighting. If there are any unmatched tracks, at step 116, a counter may be updated, assisted with track to indicate how long the track is existed without matching. In some embodiments, this count is reset whenever the track is matched to a candidate saving. In some embodiments, each time a track is matched to a candidate sighting, a last matched timestamp is updated for that track. Then, rather than using account at 116 the current timestamp can be compared to the last matched timestamp. If the time since last match exceeds a threshold, the track can be deleted.

At step 117, the count or difference in timestamps associated with the track, which indicates how long a track has gone unmatched, is compared a threshold criteria. If it exceeds these criteria, at step 118, the track can be deleted from the track database. Then, the loop returns to step 115.

If the unmatched track does not exceed the stale criteria at step 117, the loop can simply return to step 115, with the recent lack of match noted in the updated count (or noted by not updating a timestamp for the track).

Once there are no more unmatched tracks. At step 115 method 110 exits and return step 122.

Each track structure contains the fields described earlier. Since these messages contain relatively little information and each camera only communicates with its near neighbors, the method makes efficient use of the available communication bandwidth which is often quite limited. This interval can be a separate interval from the frame rate.

Information about the targets in the scene is generally distributed among the smart cameras in the network. In fact information about the trajectory of a particular target is distributed among the smart camera nodes that viewed the target at various portions of its trajectory. These trajectory can linked by a common target id which can be used to correlate the information across the network.

In order to harvest information from the network some embodiments employ a subscription model where a user can inject a request into the network indicating her interest in particular kinds of tracking events. This request can be broadcast periodically through the prevailing communication network to the individual camera nodes which would respond by sending back events that matched the criterion of the query.

For example a user may indicate that she is interested in all tracks passing through a particular region in the scene or all tracks that persist for more than a certain amount of time. Alternatively she may indicate interest in a particular set of target ids which could then be tracked over time with the information relayed back to the subscriber.

This scheme can decouple the service providers, the individual smart camera nodes, from the service subscribers. The subscribers need not request information from particular nodes which could fail or be removed at any time but would rather phrase their request in terms of queries which would be broadcast to all of the nodes that may be able to provide them with the desired information. This would mean that individual smart camera nodes can change their mode of operation without disabling client applications. The network could service multiple applications for multiple subscribers concurrently.

Target detection can entail any form of detection available in the art. This can include sophisticated target detection schemes such as face detection or pedestrian recognition which could cut down on false sightings. Additionally or alternatively, the detection scheme can be a hashing segmentation scheme, such as that disclosed in concurrently filed application, titled "Image Segmentation for Distributed Target Tracking and Scene Analysis," which has common inventorship and is incorporated herein by reference. Furthermore, the target detection scheme could make use of a ranging device in conjunction with image processing, such as is illustrated in the methods and systems disclosed in concurrently filed application, titled "Scene Analysis Using Image and Range Data," which has common inventorship and is incorporated herein by reference.

Application Example

Figure 4A:
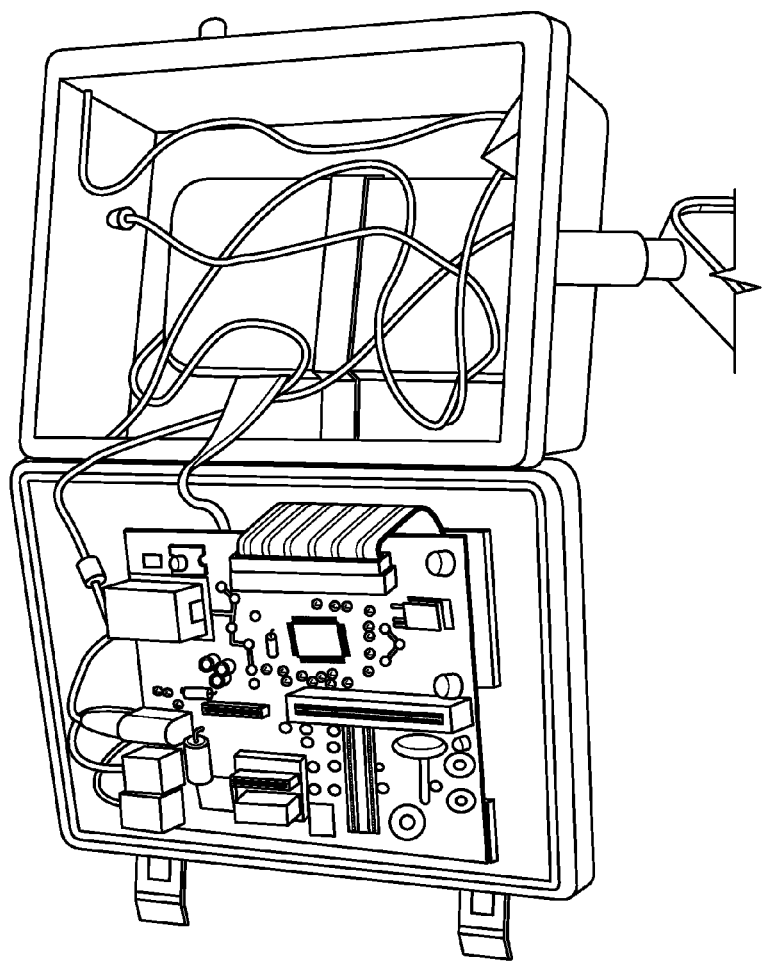
FIG. 4A is a photographic view showing the outside and inside of exemplary cameras for use with embodiments of the present application.
Figure 4A:
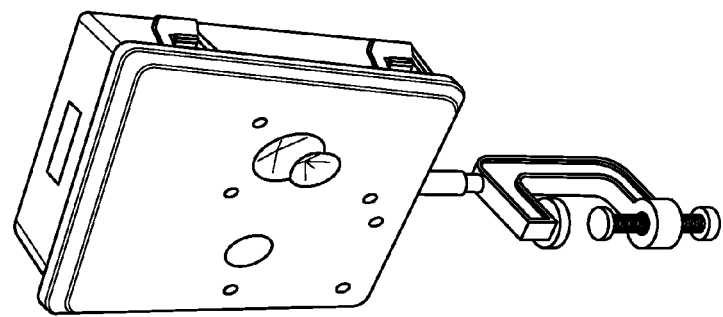

The proposed tracking scheme can be tested using a set of customized smart camera nodes, such as shown in FIG. 4A. A system diagram is depicted in FIG. 4B. In this illustrative embodiment, each smart camera device 210 includes a processor 222, which can include a dual core 600 MHz Blackfin processor from Analog Devices and suitable supporting hardware. An exemplary processor 222 includes a Digital Signal Processor designed to support high performance image processing operations in low power devices, such as cameras and cell phones. Each smart camera device 210 includes an imaging device 224 coupled to the other components, including processor 222 via one or more internal busses. This imaging device can include a digital camera sensor, optics, image processing or filtering hardware, and the like. An exemplary imaging device 224 is suitable for observing an image field and capturing an image for us by the system and methods for tracking described herein. In some embodiments, imaging device 224 includes an Aptina CMOS imager, such as an XVGA resolution imager (720× 480) and a fisheye lens which affords a field of view of approximately 180 degrees. Each imaging device also includes a transceiver 225 for communicating with other camera devices 210 and/or a central controller 250. Transceiver 225 can include a wireless transceiver and antenna, such as a Zigbee wireless communication module, an Ethernet controller. The smart camera device 210 can also include sensors 228, such as a three axis accelerometer, as well as an 850 nm high intensity infrared signaling light or other positioning beacon 232. Image and track data can be captured and stored in memory 230, which can include program and data memory. Memory 230 can store a database of tracks, which may include archival of recent tracks, and may further include memory configured to store data about current sightings, including a cache of current candidate targets observed and received from other smart camera devices.

In some embodiments, each smart camera device 210 is a low power device, which may be powered by a battery. In some embodiments, a smart camera device can consume less than 3 watts of power in operation and can be powered for 6 hours or more with a 6 ounce Lithium Ion battery pack. Alternatively, lower power can be used to extend battery life and/or an external power source can be provided.

A plurality of smart camera devices 210 can be placed about an environment for observation, such that at least a subset of cameras is arranged such that its image plane intersects with the image plane of a subset of nearby cameras. In some embodiments, the set of cameras can also include some smart camera devices that do not have an intersecting image plane, such as a camera whose beacon 232 is observable by another camera, but whose image plane does not include any other beacons. These may be used to supplement the systems described herein to allow for a larger observable area.

Each smart camera device communicates with neighboring camera devices via tranciever 226. This can include communication via peer-to-peer communication or network 240, which can include a wi-fi network including one or more hubs or routers, or an ad hoc or mesh network for more flexible communication. Network 240, need not have separate components, and may not necessarily allow all camera devices (which can be considered nodes in the overall camera network) to communication. It will be understood that a system using peer-to-peer communication can be described as having a network 240.

In some embodiments, smart camera nodes to 10 can communicate if a central controller 250. Central controller 250 can include a server, computer, mobile device, PC, Mac, or higher powered computing device relative to smart camera devices 210. Central control 250 can receive periodic updates on important tracks, which may include all tracks, or a subset of tracks observed by smart camera devices 210. Controller 250 can then store these tracks in memory 252. Memory 252 can include instruction and data memory for operating controller 250. Memory 252 can include a database of archived tracks, as well as image data (which may be received periodically from camera devices 210 or environment model for the environment in which the plurality of smart camera devices are deployed.

Tracks stored in memory 252 can be displayed to the user via user interface 254. User-interface 254 can include a GUI, a readable file, such as an XML file, and may include sending visual or data information to a user via a network. For example, tracks stored in memory 252 can be sent to a user's mobile device via a network. Information sent to a user can include filterable information selected from a database in memory 252. In some embodiments, central controller 250 maintains a list of alert criteria for comparing to tracks received from camera devices and/or stored in memory 252. In response to a comparison of alert criteria, processor 250 can cause alerts to be sent to user via interface 254. These alerts may include information about the track or tracks that triggered the alert. Alerts can be used in a surveillance environment to identify instances where a security zone has been breached.

In some embodiments, memory 252 includes instructions to allow central controller 250 to send up dates or configuration information to nodes in the camera network. This allows some degree of central control for rolling out updates to a system, while allowing much of the routine tracking steps to be performed independently by camera nodes to 10 on an ad hoc basis. This can reduce overall system bandwidth requirements, and can allow low powered processing of image data at each node, rather than central processing of all image data.

Figure 5:
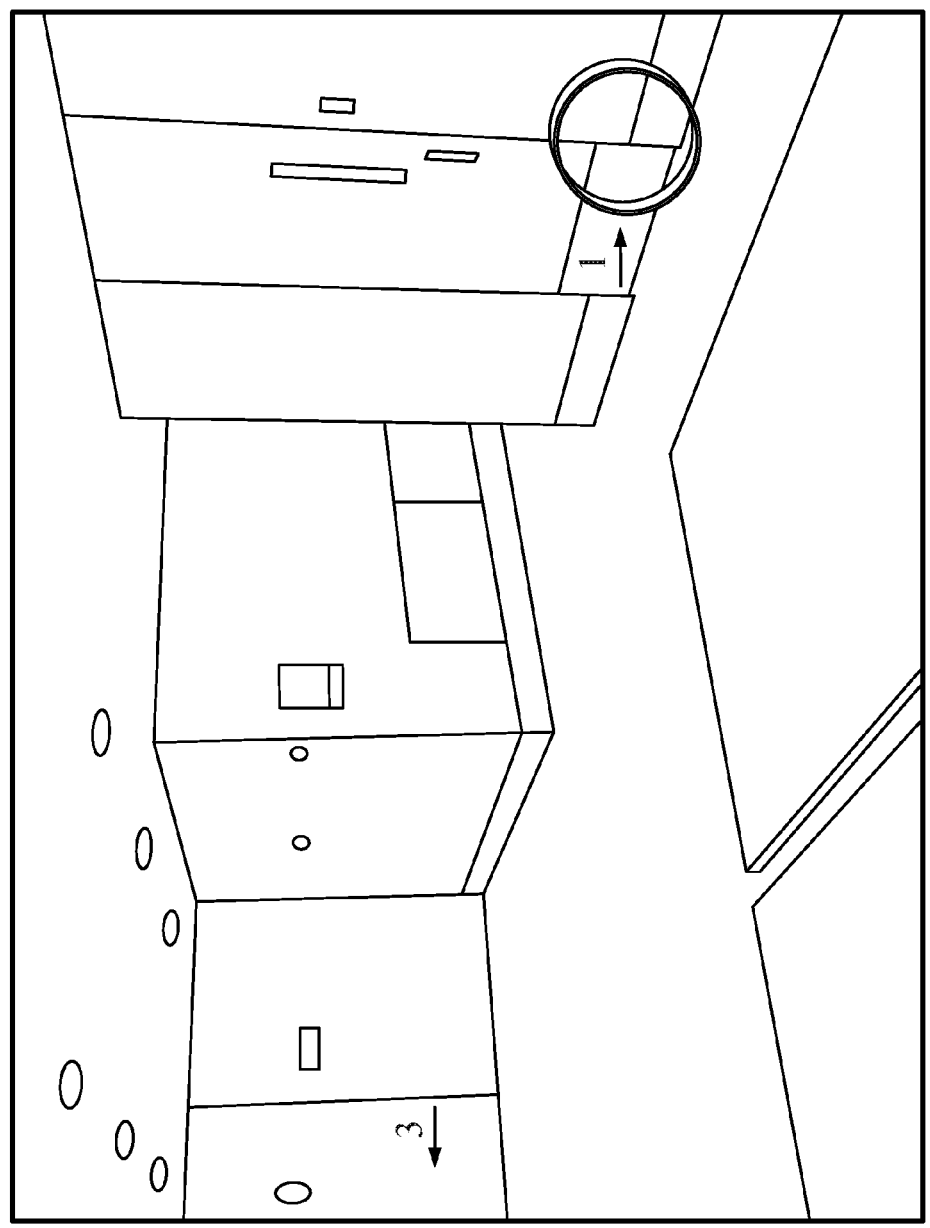
FIG. 5 is a photographic view of exemplary cameras for use with embodiments of the present application placed in a tracking environment.

In an experiment, a set of 8 cameras were deployed in an ad-hoc manner to cover the entire first floor of an office building, an area approximately 14 meters on side shown in FIG. 5. FIG. 5 shows a photo of a room where to cameras, legal one and three, have been placed on the walls in inconspicuous locations that are visible to one another. These locations can be chosen such that a person being tracked is not easily where of the location of the cameras. The cameras were automatically localized as described in U.S. Pat. Nos. 7,421,113 and 7,522,765 and then used to track targets moving through the area of regard in real time.

The first stage in the target tracking procedure can include an adaptive background subtraction phase which determines which aspects of the image have changed significantly over time. A connected component phase can be applied to the resulting binary image to find the most significant moving targets in the scene. The result of this analysis is a set of bearing vectors emanating from each of the cameras into the scene. All of the real-time image processing can occur on the smart camera nodes themselves. Only the final sighting vectors associated with the targets are relayed over the Zigbee wireless network for further processing. This approach can allow one to distribute the most computationally intensive aspects of the tracking procedure onto the smart camera nodes and avoid having to relay video imagery over the limited wireless bandwidth. In some embodiments, each smart camera system extracts sighting measurements from the images at a rate of 15 frames per second.

Figure 6:
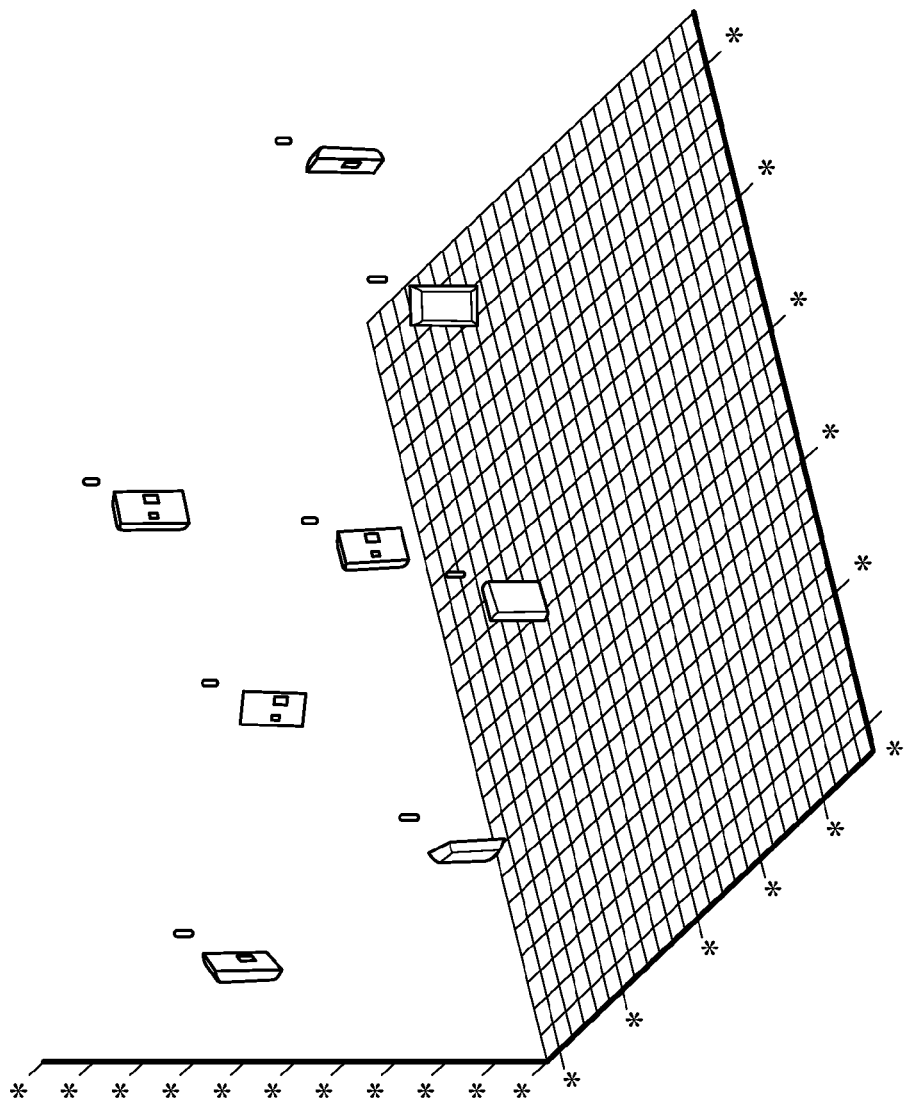
FIG. 6 is a 3-D view of exemplary cameras for use with embodiments of the present application placed in a tracking environment.

FIG. 6 illustrates that smart cameras can automatically determine their positions and orientations with respect to each other in 3D in a matter of seconds. FIG. 6 shows exemplary three-dimensional environment with environmental features removed. A plurality of cameras in the 3D environment observe each other and readily determine their relative position within the environment.

Figure 7:
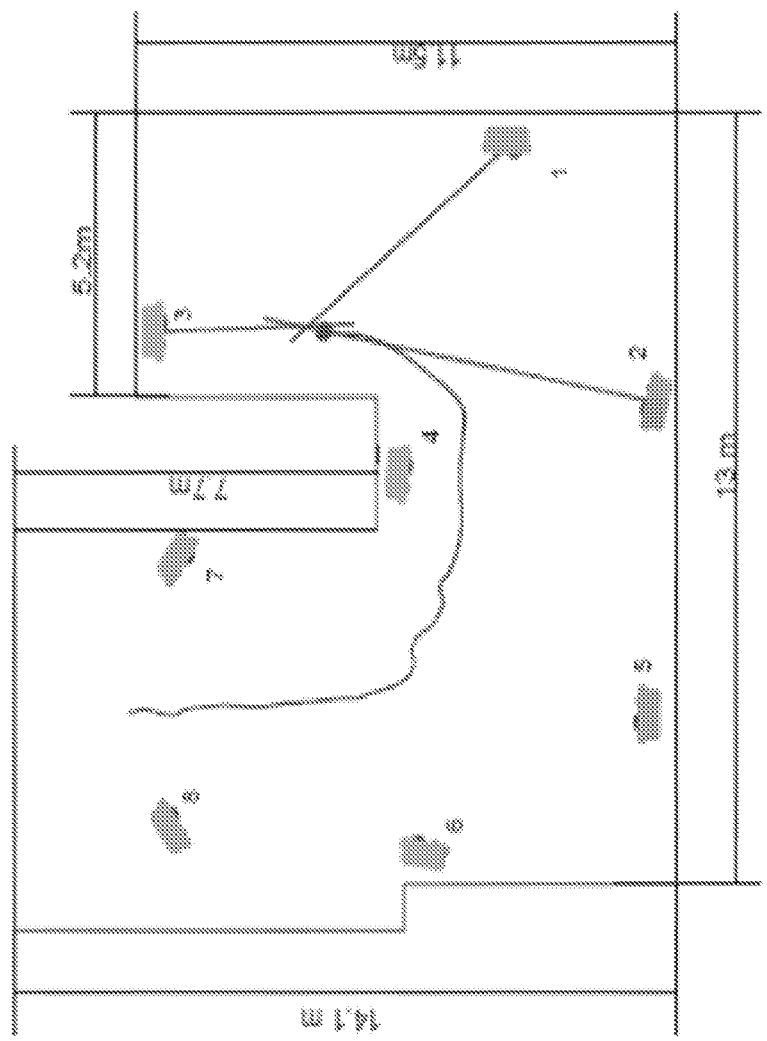
FIG. 7 is a plot of a tracked object path in relation to the cameras tracking the target.
Figure 8:
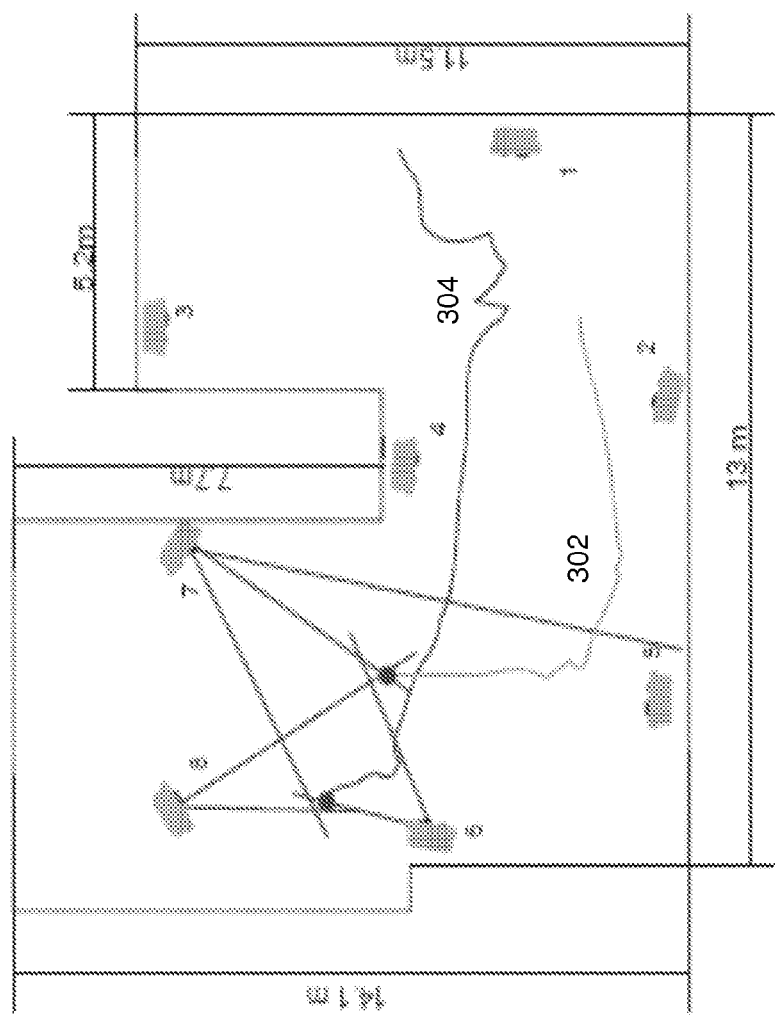
FIG. 8 is a plot of two tracked object path in relation to the cameras tracking the target.

FIGS. 7 and 8 shows the results of two tracking experiments. In the first experiment the camera network was used to track a single person who walked into and around the first floor area and eventually exited through the same point he entered. The second experiment shows the system tracking two people who start off walking together and then split off onto two separate trajectories. In both of these experiments the targets were correctly tracked and associated throughout the sequence in real time through multiple camera handoffs since the structure of the scene ensured that no one smart camera had the targets in view throughout.

FIG. 7 shows a snapshot of a real time tracking experiment showing the current position and past trajectory of a target moving through the scene. The lines emanating from the cameras 1, 2, and 3 represent sighting measurements which are triangulated to determine target location. Here, the camera network includes cameras 1-8. For example, cameras 1, 2, and 3 have a line of sight to a first point where an target originates. The curve illustrates that objects observed track through the camera network. FIG. 8 shows a snapshot of a real time tracking experiment showing the current position and past trajectory 302 and 304 of two targets moving through the scene. Spurious sighting measurements, caused by a reflection in the window, will not be confirmed other cameras and, hence, discarded.

Figure 9:
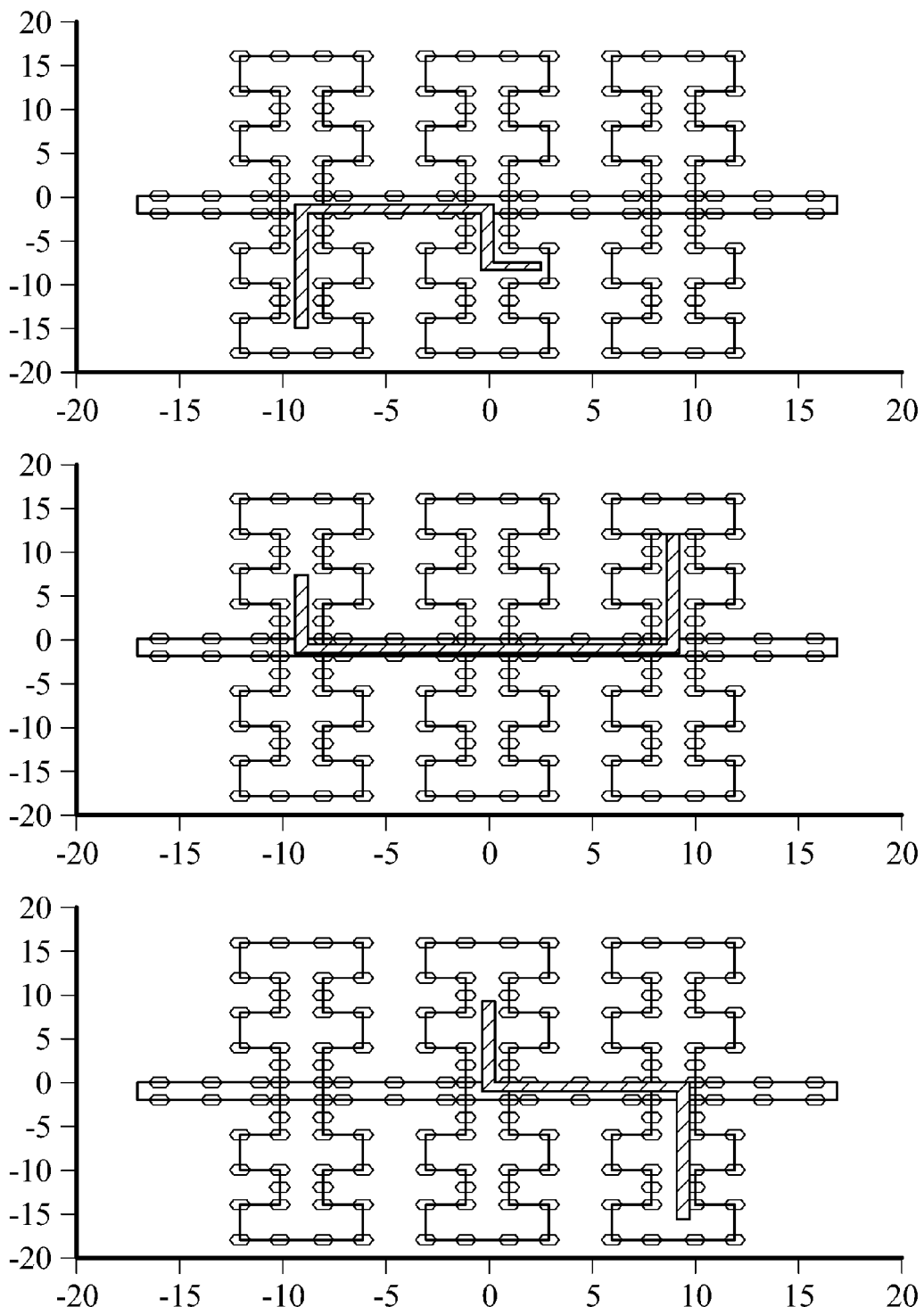
FIG. 9 is a plot of a tracked object path in relation to the cameras tracking the target in a simulation.
Figure 10:
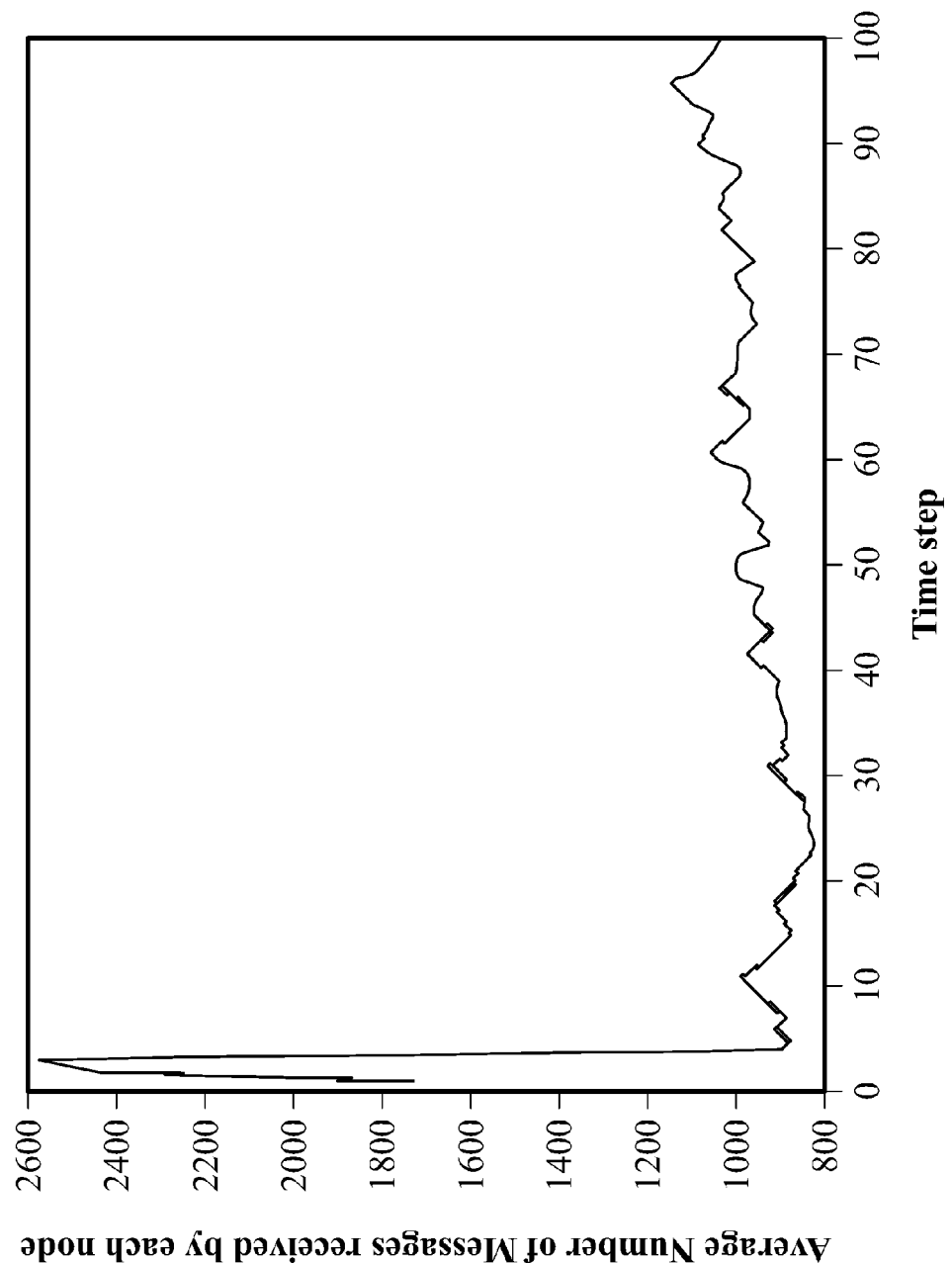
FIG. 10 is a plot of network bandwidth utilization when testing an embodiment of the present application.

In addition to the actual implementation on our smart camera network, a series of simulation experiments was carried out to investigate how the proposed scheme would perform on networks that were considerably larger than the ones we could construct with our available hardware. FIG. 9 shows an example of an indoor environment reminiscent of an airport. This particular scene is monitored by a collection of 168 cameras mounted along the walls. The cameras could only see targets within a fixed distance of their positions. Using the proposed protocol, the system was able to concurrently track a collection of 100 simulated targets over 100 timesteps. In order to characterize the communication requirements of the protocol the average number of messages received by each node was recorded on every timestep and the results are plotted on the graph in FIG. 10, which indicates the average number of messages received by each of the nodes over the course of the simulation. This plot includes both types of messages exchanged over the network, sighting measurements and track information. After an initial transient where the nodes communicate a number of measures to achieve consensus on target identifiers, the system settles into a steady state. The communication load here is evenly distributed throughout the network reflecting the distribution of the targets.

FIG. 9 shows the trajectories recovered for a few of the tracked targets. Note that the targets move throughout the environment between many cameras but the tracking system correctly maintains their identities. This simulation experiment modeled the layout of an airport. The system successfully tracked 100 targets using 168 smart camera nodes. The figure shows trajectories of individual targets successfully tracked throughout the environment. The small circles denote camera positions, the light lines indicate walls.

In order to investigate how the protocol performed in the presence of failure the simulation experiment was repeated with the additional wrinkle that on each timestep each of the simulated smart cameras had a ten percent chance of failure. A camera that fails produces no measurements in the network. Even in this situation the tracker was able to track 87 percent of the targets correctly through all 100 of the timesteps in the simulation. The remaining thirteen continue to be tracked but their identities are changed from the first to the last timestep indicating a tracker reacquisition. The resilience of the system to individual camera failure is a product of the fact that the tracker state is naturally distributed among a number of nodes so the failure of any single node is not catastrophic.

Figure 11:
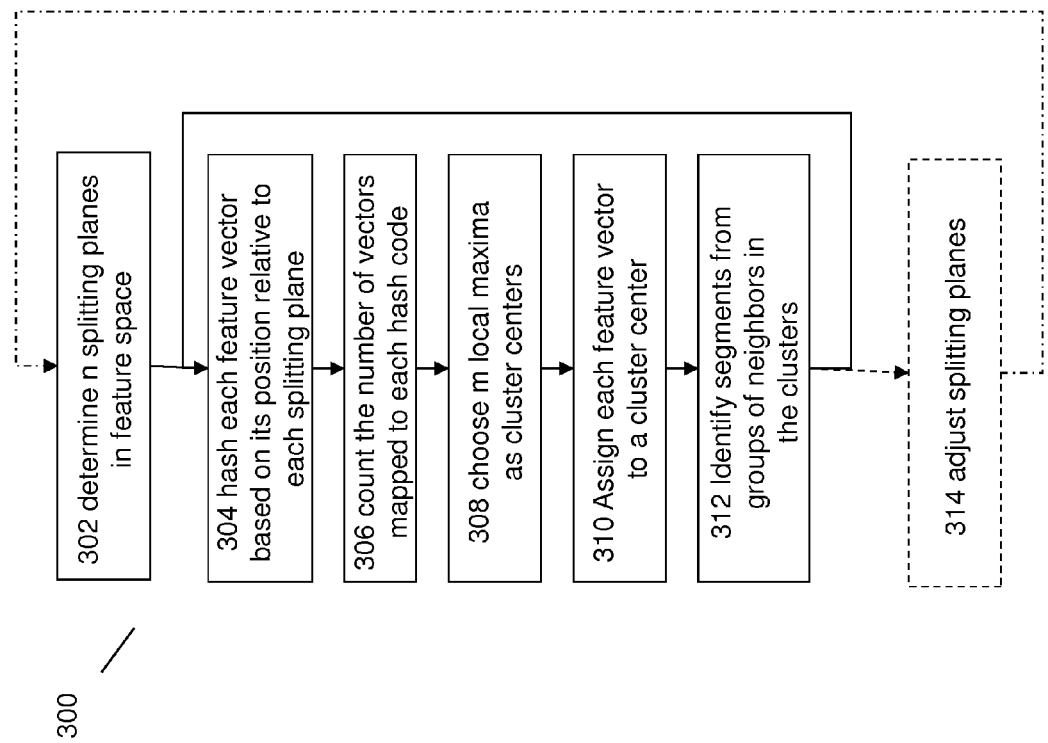
FIG. 11 is a flow chart showing operation of an exemplary algorithm segmenting images to identify tracking targets in some embodiments of the tracking camera network.

An exemplary image segmentation scheme for use with some embodiments for identifying candidate targets by randomized hashing is shown in Algorithm 2, and further elaborated in FIG. 11:

Algorithm 2 Segmentation via Randomized Hashing
1: Hash each feature vector to an n-bit code using the n randomly chosen splitting planes
2: Maintain a count of the number of feature vectors mapped to each hash code
3: Identify local maxima in the code space - these are the cluster centers
4: Assign each feature vector to the closest local maxima
5: Run connected components on the labeled pixels to identify coherent connected components.

Figure 2:
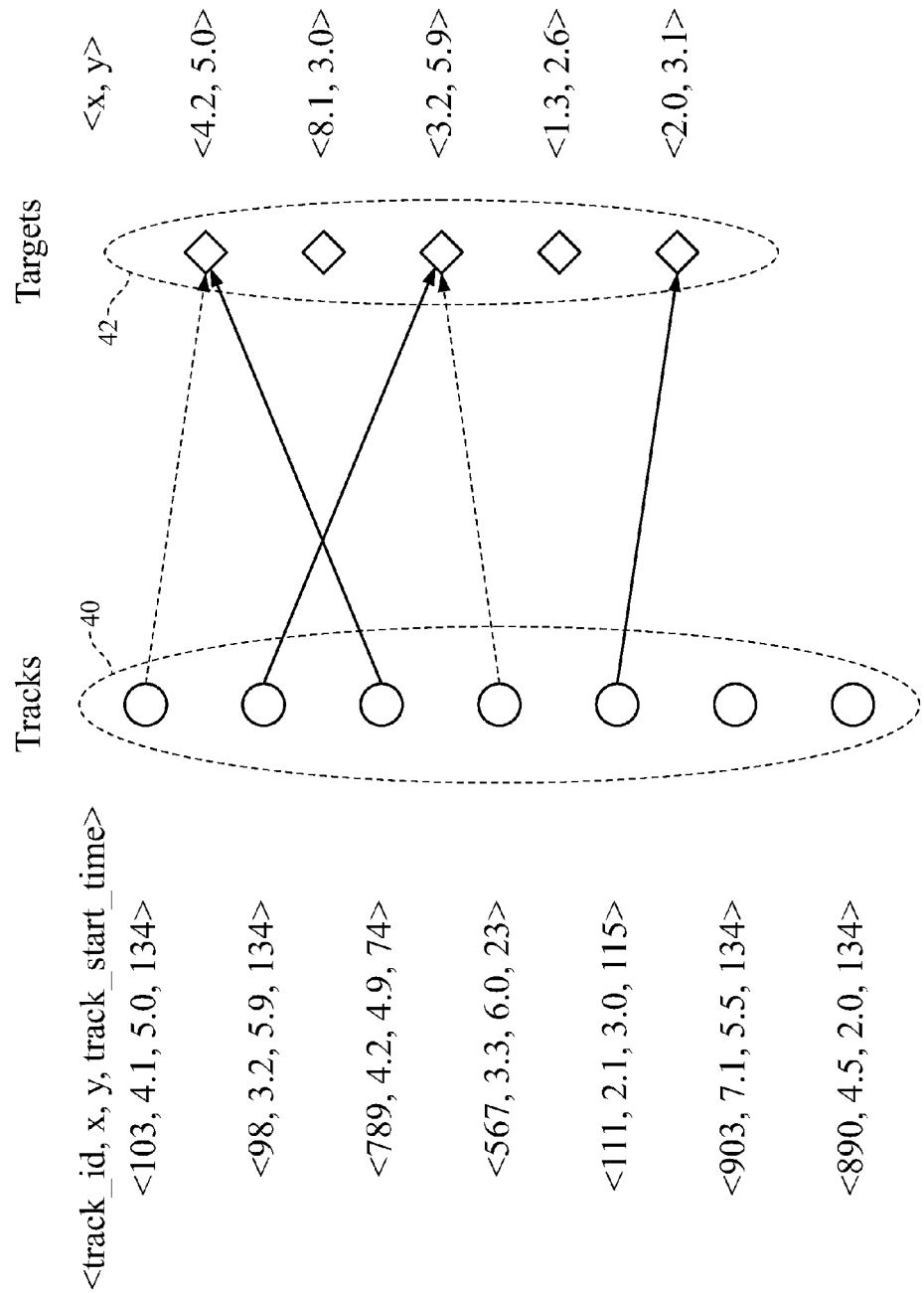
FIG. 2 is a tree diagram showing an exemplary association between tracks and targets.

FIG. 2 shows method 300 for segmenting an image. At step 302 a feature space is divided into and a predetermined number, n, of splitting planes. This step can include randomly assigning and feature planes and using a calibration image or a first image to the splitting plane for a given orientation. For example, the position of each plane can be chosen such that feature vectors (e.g. those feature vectors associated with each pixel in a test image) within the feature space are evenly divided on either side of the splitting plane. As discussed above, each splitting plane can be created by choosing a random normal vector and assigning a decision point along that vector such that the decision point is at the mean or median of the distribution of feature vectors (e.g. pixels projected on that normal vector). This can be done using a calibration image, the image under test, or the previous image under test. In some embodiments, step 302 takes into account predetermined splitting planes that have been created via prior training or have been manually assigned. At step 302, the splitting planes can include a combination of random splitting planes and preassigned splitting planes.

At step 304, each feature vector image (or a subset of the feature vectors in image) is hashed using the splitting planes. This process can be computationally simple as each bit in the hash simply determines which side of the splitting plane the feature vector resides. Because only a bit is used for this hash, additional computational overhead needed for deriving the Euclidean distance from the splitting claim is not necessary. Step 304 can be an iterative loop whereby each feature vector is taken and compared in succession to each of the n splitting planes. It will be appreciated that massive parallelism and may be possible using the right processor, such as a DSP or graphics processor, to perform this step.

Once each feature vector is hashed into the cells created by the splitting planes, the algorithm proceeds to step 306. At step 306, the number of feature vectors resident in each cell in the feature space is counted. At step 308, the residency counts for each cell in the feature space are compared to choose a number of local maxima. In some embodiments the number of local maxima, M, is predetermined prior to image processing. In other embodiments the number of local maxima, M, is derived dynamically from the image based on the results of the residency counts of each cell in the feature space. As discussed, the maximum number of local maxima, M, can be determined based on the number of splitting planes used and the Hamming distance requirements for clusters used to image segmentation. Once the local maxima are identified, these can be used as the center of each cluster used for image segmentation.

At step 310 each feature vector under test can be assigned to each of the cluster centers determined in step 308. In some embodiments, this assignment has low computational is and where. In overhead because the hash of each feature vector is compared to each of the cluster centers and the cluster having the nearest Hamming distance to the hash of the vector is selected as the cluster to which the feature vector will be assigned. In some embodiments, ties between competing clusters (i.e. clusters that are the same Hamming distance away from the hashed feature vector) can be resolved by estimating the Euclidean distance between the center of each cluster and the current feature vector. It will be appreciated that other techniques for resolving conflicts between equidistant clusters can be used, including assigning each feature vector to the equidistant cluster that has the least number of feature vectors currently assigned, or the most number.

Once each of the feature vectors is assigned to a cluster, image segments can be identified within the image. For example, adjacent pixels in the image plane that have had their feature vectors assigned to the same cluster can be considered part of the same image segment. Any known technique can be used, such as minimum threshold sizes for segments of adjacent pixels. In this way, image segments can be rapidly deduced from the image by scanning pixels in the image plane and determining whether they share the same cluster in the feature space.

In some embodiments, algorithm 300 repeats after step 312, with the next captured image. In some embodiments, step 314 may optionally adjust the splitting planes based on the results in step 312. For example, in a training scheme the results of step 312 can be compared via a consistency score with a desired segmentation result. Based on this result, the splitting planes can be adjusted to improve this consistency score. In some embodiments, incremental improvement of splitting planes is done in real time based on other criteria, such as reducing the number of identified segments in step 312 or increasing the number of identified segments in step 312 to reach a desired range of segments. Once the splitting planes are adjusted the algorithm can return to step 302.

It should be readily apparent that the image processing techniques taught herein are suitable for execution in a computing environment that includes at least one processor. Suitable processing environments can include Intel, PowerPC, ARM, or other CPU-based systems having memory and a processor, but can also include any suitable embedded systems, DSP, GPU, APU, or other multi-core processing environment including related hardware and memory. Similarly, the algorithms taught herein can be implemented by dedicated logic. Similarly, execution of these algorithm and techniques is not limited to a single processor environment, and can, in some contemplated embodiments, be performed in a client server environment, a cloud computing environment, multicore environment, multithreaded environment, mobile device or devices, etc.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method of tracking one or more targets moving through an environment, comprising:
 a first camera device capturing a first image of one or more targets as it moves through an image plane of the first camera device;
 a second camera device receiving a second image of the one or more targets as it moves through an image plane of the second camera device;
 extracting a first set of one or more target sightings in the first image and a second set of one or more target sightings in the second image, each target sighting of the first and second sets of one or more target sightings comprising:
 a target bearing to a respective target;
 a state vector for the respective target, the state vector comprising an indication of a position and a velocity of the respective target along a target track;
 an indication of a time associated with the respective target; and
 an indication of a unique identifier that identifies the respective target;
 triangulating, based at least in part on target bearings of the first and second sets of one or more target sightings, to create a third set of target sightings;
 matching at least a subset of the third set of target sightings to one or more target tracks maintained by the first camera device;
 updating matched target tracks with at least said subset of the third set of target sightings and forming new target tracks for unmatched target tracks; and
 communicating, by the first camera device to the second camera device, at least one updated track that was matched by the matching step and updated in the updating step.

2. The method of claim 1, wherein the second image is received over a peer- to-peer wireless network.

3. The method of claim 1, further comprising storing, based on the matching, information associated with at least one track in a database of the first camera device.

4. The method of claim 3, further comprising the step of displaying the track information.

5. The method of claim 1, further comprising deleting a first subset of one or more known tracks maintained by the first camera device if the first subset of known tracks fails to match any of third set of target sightings after a predetermined amount of time.

6. The method of claim 1, wherein the matching further comprises choosing an oldest known track when more than one known track matches at least one target sighting.

7. The method of claim 1, further comprising transmitting information about target tracks, by the first camera device, wherein an intended recipient of the transmitted information about target tracks comprises a neighboring camera device.

8. A device for tracking one or more targets through an environment comprising:
 first and second camera devices;
 a processor; and
 memory coupled to the processor, the memory comprising executable instructions that when executed by the processor cause the processor to effectuate operations comprising:
 capturing a first image of one or more targets as it moves through an image plane of the first camera device;
 extracting a first set of one or more target sightings in the first image;
 receiving a second image of the one or more targets as it moves through an image plane of the second camera device; and
 extracting a second set of the one or more target sightings in the second image, wherein each target sighting of the first and second of target sightings comprises a target bearing to a respective target, a state vector for the respective target, the state vector comprising an indication of a position and a velocity of the respective target along a target track, an indication of a time associated with the respective target, and an indication of a unique identifier that identifies the respective target;
 triangulating, based at least in part on target bearings of the first and second target sightings, to create a third set of target sightings;

matching at least a subset of the third set of target sightings to one or more target tracks maintained by the first camera device;

updating matched target tracks with at least said subset of the third set of target sightings and forming new target tracks for unmatched target tracks; and communicating from the first camera device to the second camera device at least one updated track that was matched by the matching and updated by the updating.

9. The device of claim 8, the operations further comprising:

exchanging information with the second camera device over a peer-to-peer wireless network.

10. The device of claim 8, further comprising memory configured to store at least one updated track in a database of the first camera device based on the matching step.

11. The device of claim 8, the operations further comprising:

deleting a first subset of one or more known tracks if the first subset of known tracks fails to match any of the third set of target sightings after a predetermined amount of time.

12. The device of claim 8, the operations further comprising:

choosing an oldest known track when more than one known track matches at least one target sighting.

13. The device of claim 8, the operations further comprising:

transmitting information about target tracks from the first camera device to a neighboring camera device.

14. The device of claim 13, further comprising a display that displays the track information.

* * * * *